United States Patent
MacIntosh (10) Patent No.: US 10,915,272 B2
(45) Date of Patent: Feb. 9, 2021

(54) DATA MANAGEMENT IN SHARED STORAGE SYSTEMS INCLUDING MOVEMENT OF LOGICAL UNITS OF DATA AND MAPPING OF VIRTUAL DEVICES TO STORAGE DEVICE GROUPS, WHEREIN THE MOVEMENT AND THE MAPPING ARE, BOTH, BASED ON POLICY SPECIFYING THAT BACKUP DATA TYPE CANNOT BE SHARED WITH OTHER DATA TYPES

(71) Applicant: International Business Machines Corporation, Armonk, NY (US)

(72) Inventor: Fraser I. MacIntosh, Reading (GB)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 15/981,013

(22) Filed: May 16, 2018

(65) Prior Publication Data
US 2019/0354296 A1    Nov. 21, 2019

(51) Int. Cl.
*G06F 3/06* (2006.01)
(52) U.S. Cl.
CPC .......... *G06F 3/0685* (2013.01); *G06F 3/0604* (2013.01); *G06F 3/0631* (2013.01); *G06F 3/0647* (2013.01)
(58) Field of Classification Search
CPC .... G06F 3/0685; G06F 3/0631; G06F 3/0604; G06F 3/0647
See application file for complete search history.

(56) References Cited

U.S. PATENT DOCUMENTS 8,341,350 B2    12/2012   Jess et al.
8,473,466 B1 *  6/2013    Milby .................. G06F 16/217
                                                 707/694

(Continued)

FOREIGN PATENT DOCUMENTS

CN       104731517 A      6/2015
WO       2010/099992 A1   9/2010

OTHER PUBLICATIONS

Z. Yang et al. "AutoTiering: Automatic Data Placement Manager in Multi-Tier All-Flash Datacenter", Performance Computing and Communications Conference (IPCCC), 2017 IEEE 36th International, Dec. 10-12, 2017, pp. 1-8.

*Primary Examiner* — William B Partridge
*Assistant Examiner* — Chie Yew
(74) *Attorney, Agent, or Firm* — Kunzler Bean & Adamson (57) ABSTRACT

Methods and systems for managing data in shared storage systems, such as virtualized storage arrays, physical disks and hypervisor data stores are provided. One method includes providing multiple data storage devices including a bottom tier of data storage devices including a plurality of physical data storage devices and at least one higher tier of data storage devices including a plurality of virtual data storage devices and storing, by a processor, a data type record including a list of data types recognized by a storage system and a plurality of access control records. The method further includes controlling movement of logical units of data within the storage system resulting from data operations that map data between the data storage tiers while maintaining one or more policies defined in the plurality of access control records. Systems and computer program products for performing the above method are also provided.

20 Claims, 5 Drawing Sheets

(56) References Cited

U.S. PATENT DOCUMENTS

| | | | |
|---|---|---|---|
| 9,817,766 B1 | 11/2017 | Si et al. | |
| 2004/0199566 A1* | 10/2004 | Carlson | G06F 16/10 |
| | | | 709/201 |
| 2013/0054518 A1* | 2/2013 | Anglin | G06F 16/27 |
| | | | 707/610 |
| 2014/0115579 A1 | 4/2014 | Kong | |
| 2014/0344809 A1* | 11/2014 | Jin | G06F 9/455 |
| | | | 718/1 |
| 2015/0006787 A1 | 1/2015 | Liu et al. | |
| 2015/0019809 A1 | 1/2015 | Thomas | |

* cited by examiner

DATA MANAGEMENT IN SHARED STORAGE SYSTEMS INCLUDING MOVEMENT OF LOGICAL UNITS OF DATA AND MAPPING OF VIRTUAL DEVICES TO STORAGE DEVICE GROUPS, WHEREIN THE MOVEMENT AND THE MAPPING ARE, BOTH, BASED ON POLICY SPECIFYING THAT BACKUP DATA TYPE CANNOT BE SHARED WITH OTHER DATA TYPES

FIELD

The subject matter disclosed herein relates to managing data in shared storage systems, such as virtualized storage arrays, physical disks and hypervisor data stores.

BACKGROUND

Virtualized storage arrays can be implemented with the IBM SAN Volume Controller (SVC) vended by International Business Machines Corporation® of Armonk, N.Y. The IBM SAN SVC is used in various IBM products including "Storwize" and "Spectrum Virtualize." Many shared storage systems, and in particular virtualized storage arrays, make use of the concept of a logical unit number (LUN), which is a unique identification number used to label each logical unit of storage. A single logical unit identified by its LUN is treated by the storage system as a single device. Access and control privileges can be assigned through LUNs for managing logical units of storage in a storage area network (SAN), for example. A LUN can reference the logical unit composed of an entire redundant array of independent disks (RAID/erasure coded), one or more drives, or one or more partitions within a drive. A logical unit is thus the basic unit of data storage that forms a file, or part of a file, in a virtual disk of a virtual machine, or indeed a physical disk on which the data of a virtual machine is stored.

Shared storage systems, in particular those using LUNs, can by accident end up inappropriately storing incompatible data together on the same physical disk (e.g., in the back end), in which the incompatibility may be the result of a clash of data types, or due to policy considerations that mean two logical units should not be stored together on the same physical storage device or at the same geographical location. This may happen, for example, when a virtual disk presents a virtual logical unit made up of multiple slices of different back end physical disks to a virtual storage system, or when a virtual machine monitor (hypervisor) presents a virtual disk to a virtual machine. An example issue can include the physical or virtual disks of a backup server end up sharing the same back-end physical disks as the data they are backing up. Issues of this kind are likely to arise in automated tiering systems or virtual machine migration, in which logical units or virtual disks are moved from one physical or virtual store to another, and hence often from one physical disk to another, without regard to enforcing original design requirements relating to separation of data.

BRIEF SUMMARY

Methods and systems that can manage data in shared storage systems, such as virtualized storage arrays, physical disks and hypervisor data stores are provided. One method includes providing a plurality of data storage devices including a bottom tier of data storage devices including a plurality of physical data storage devices and at least one higher tier of data storage devices including a plurality of virtual data storage devices and storing, by a processor, a data type record including a list of data types recognized by a storage system and a plurality of access control records, wherein each access control record specifying a policy for a given data type and stipulates one or more other data types that are permitted or not permitted to share at least one specified group of the data storage devices. The method further includes and controlling movement of logical units of data within the storage system resulting from data operations that map data between the data storage tiers while maintaining one or more policies defined in the plurality of access control records.

A system includes a bottom tier of data storage devices including a plurality of physical data storage devices, at least one higher tier of data storage devices, each higher tier comprising a plurality of virtual data storage devices, and a data controller configured to manage data operations on one or more logical units of data. The data controller can include a policy module that includes a data type record storing a list of data types recognized by the system and a plurality of access control records specifying a policy for a given data type, stipulating with which of the other data types said given data type is permitted or not permitted to share at least one specified group of the data storage devices and a runtime module that manages data operations to associate one of the data types with each logical unit of data and controls movements of logical units of data within the storage system.

Also disclosed are computer program products comprising a computer-readable storage medium including program instructions embodied therewith for managing data in shared storage systems, such as virtualized storage arrays, physical disks and hypervisor data stores. Some program instructions are executable by a processor and cause the processor to provide a plurality of data storage devices including a bottom tier of data storage devices including a plurality of physical data storage devices and at least one higher tier of data storage devices including a plurality of virtual data storage devices and store a data type record including a list of data types recognized by a storage system and a plurality of access control records, wherein each access control record specifying a policy for a given data type and stipulates one or more other data types that are permitted or not permitted to share at least one specified group of the data storage devices. The processor s further configured to control movement of logical units of data within the storage system resulting from data operations that map data between the data storage tiers while maintaining one or more policies defined in the plurality of access control records.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which.

DETAILED DESCRIPTION

Disclosed herein are various embodiments providing methods, systems, and computer program products that can manage data in shared storage systems, such as virtualized storage arrays, physical disks and hypervisor data stores. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

Figure 1:
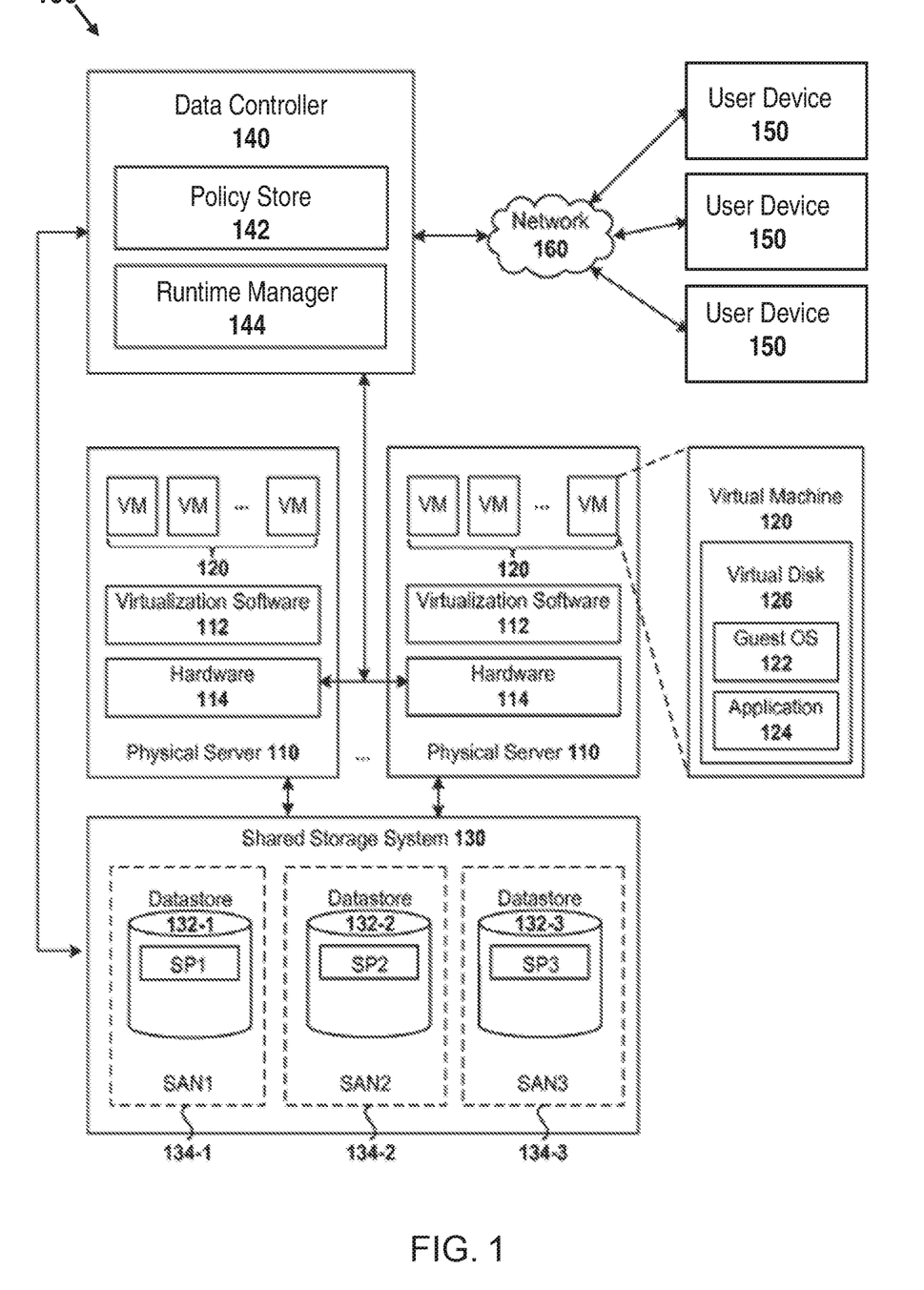
FIG. 1 is a block diagram of one embodiment of a multi-tiered data storage system incorporating a virtualized storage array.

With reference now to the figures, FIG. 1 is a block diagram of a system 100 incorporating a virtualized storage array according to an embodiment of the invention. At least in the illustrated embodiment, the storage system 100 includes physical storage devices in the form of physical servers 110 that each execute virtualization software 112 (e.g., a hypervisor) and include suitable hardware 114 to support multiple virtual machines 120.

The storage system 100 further includes a data controller 140, which may be accessed by one or more user devices 150 via a network 160. The data controller 140 provides policy management for the virtualization, which is subsumed in a policy store 142, and also provides virtual machine provisioning via a runtime manager 144. The user devices 150 may be operated by any quantity and/or type of suitable users, such as system administrators, organization administrators, database users, application developers and/or system architects.

The virtualization software 112 maintains a mapping between virtual resources and physical resources of physical server 110, such as CPU resources (e.g. processors), memory resources (e.g. random access memory (RAM)) and network resources (e.g. access networks). Virtual machines 120 are also provisioned with storage resources, such as a shared storage system 130 having multiple datastores 132-1, 132-2 and 132-3 which are collectively referred to as datastore 132.

The term "datastore," as used herein, may broadly refer to a logical container that hides specifics of the underlying storage resources to provide a uniform model for storing virtual machine data. The datastores 132-$n$ may each represent a formatted file system that physical servers 110 mount and share. The file system may include a cluster file system that supports virtualization (e.g., a Virtual Machine File System (VMFS) and Network File System (NFS) provided by network attached storage (NAS)). The term "datastore" may also refer to one or more storage pools in which each represents a logical slice of datastore 132. In the example of FIG. 1, datastores 132-1, 132-2, and 132-3 (also simply referred individually, in various groups, or collectively as datastore(s) 132) are illustrated as including a respective storage pool "SP1", "SP2" and "SP3."

In practice, datastores 132 on the shared storage system 130 may have different capabilities defined in terms of capacity, input/output (I/O) capability, disk format etc. For example, the shared storage system 130 may include multiple storage devices (e.g., 134-1, 134-2, 134-3) of any suitable technology, such as storage area networks (SAN) and network-attached storage (NAS).

SAN devices generally use access protocols, such as Internet Small Computer System Interface (iSCSI) and fiber channel to provide block level access to storage resources. On the other hand, NAS devices generally support file-based protocols, such as network file system (NFS) to provide shared file-level access to storage resources. The datastores 132 on the shared storage system 130 may also, in some embodiments, refer to local storage, in particular storage-rich servers, such as in hyperconverged systems.

In the embodiment illustrated in FIG. 1, the shared storage system 130 includes three SAN devices on which the datastores 132-n are located (e.g., datastore "SP1" on "SAN1," datastore "SP2" on "SAN2," and datastore "SP3" on "SAN3." Although only SAN devices are shown in FIG. 1 for simplicity, the shared storage system 130 may include NAS devices, or a combination of SAN and NAS devices. Depending on the characteristics of the underlying storage devices, datastores 132 may be used for different storage purposes.

Each virtual machine 120 may support a guest operating system 122 and at least one application 124 (e.g. a database instance). When creating the virtual machine 120, a certain amount of storage resources is allocated to the virtual machine 120. In particular, a virtual disk 126 may be created for virtual machine 120 to store data (e.g. files) for the virtual machine 120. The term "virtual disk," as used herein, may generally refer to an entity that appears to the guest operating system 122 as a single disk.

A virtual disk 126 may be used by a virtual machine 120 to store different types of data, such as data relating to operating systems and/or guest operating systems, data for applications, database data, database log data and/or backup data. At a chosen tier of the virtualization, different ones of the virtual disks may be created for storing data of each data type (e.g. a backup data disk, an OS data disk) and a single virtual machine 120 can operate multiple ones of such virtual disks 126.

The process of deciding the mapping between physical and virtual storage (e.g., mapping between datastores 132-n and virtual disks 126 of virtual machine 120) can be referred to as "data placement" or simply "placement." Placement may be determined when the virtual machine 120 is created during provisioning, or when an additional virtual disk is added to an existing virtual machine. Completing the placement process results in a given virtual disk residing on, and its data stored on, one or more of the datastores 132-n.

The data placement process can be carried out in the data controller 140 by the runtime manager 144 following data placement policies stored in the policy store 142. The data placement policies are specified in such a way that data placement can be fully automated, although it may be useful to allow the option of some element of manual intervention by a user with system administrator rights.

Figure 2:
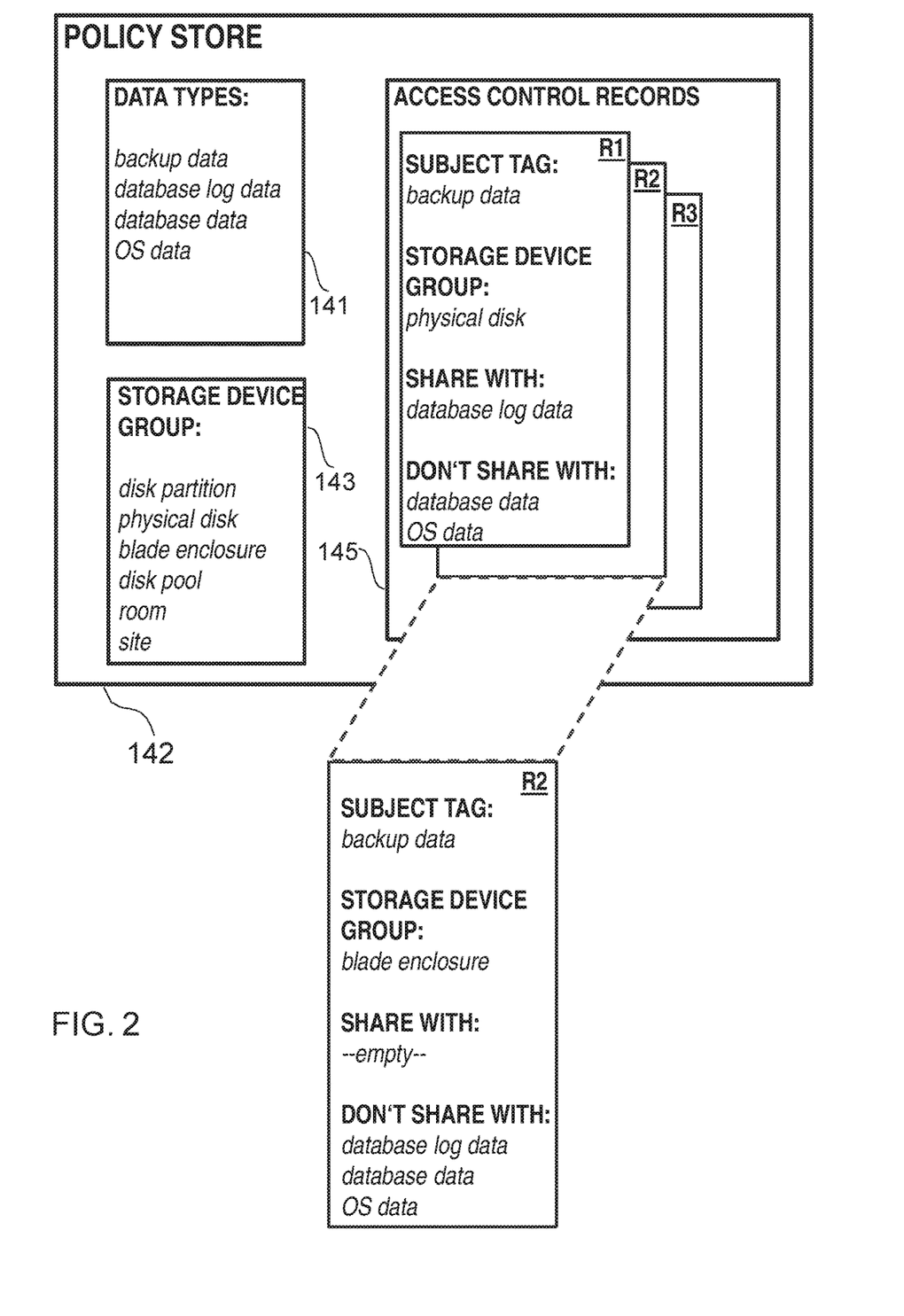
FIG. 2 is a diagram illustrating the policy store of FIG. 1.

FIG. 2 shows the policy store 142 of FIG. 1 in greater detail. The policy store 142 has a data type record 141 in which a list of the data types that are recognized by the system is stored. The example data types illustrated can include, but are not limited to: backup data, database log data, database data and/or OS data, among other data types that are possible and contemplated herein.

The policy store 142 also includes a storage device group record 143, in which a list of the data storage device groups that are recognized by the system is stored. The example storage device groups illustrated can include, but are not limited to: a partition, a physical disk, a blade enclosure, a disk pool, a room, and/or a site, among other types of store devices that are possible and contemplated herein.

The policy store 142 further includes an area 145 for storing access control records R1, R2, R3 . . . Rn. Each access control record specifies the data storage device group to which it applies. The example illustrated access control record R1 is specific to the storage device group "physical disk." The subject tag is "backup data." As such, record R1 defines the policy specifying how backup data may be stored with other data types in a physical disk.

A "Share with/Don't Share with" part of the access control record R1 specifies that backup data is permitted to be shared on a physical disk with database logs, and that backup data is not permitted to be shared on a physical disk with database data or OS data. Although the "Share with" and "Don't Share with" are illustrated as being separate lists, logically speaking one of these lists is redundant (e.g., the record only needs to express which data types can be shared, or which cannot be shared) to provide a complete specification. Nevertheless, it is a useful feature to have separate lists for "Share with" and "Don't Share with," since this allows the specification to be expressed either inclusively or exclusively, or both at the same time, as desired. In other words, "(Do) Share with X" can be used to also express by implication "Don't share with" anything else. Similarly, "Don't share with Y" by implication means "(Do) Share with" anything else. Moreover, "Don't share with X" in combination with "Do share with Y," can mean that the data cannot be shared with X, but can shared be with Y and nothing else. The simultaneous provision of both "Share with" and "Don't share with" therefore makes configuration more flexible.

In FIG. 2, the contents of a second example access control record R2 is also shown. Access control record R2 is specific to the storage device group "blade enclosure." The subject tag is "backup data." The "Share with/Don't Share with" part of the access control record R2 specifies that backup data cannot be shared with any other data types. This policy can ensure that all disks or servers in a whole blade enclosure may relate exclusively to backup data. There will thus be a blade enclosure in the rack of the data center that will be a dedicated back up enclosure.

Example groups may be based on grouping storage devices that can include:
  (a) disk partitions in a common physical disk;
  (b) physical disks in a common server;
  (c) servers mounted on blades housed in a common blade enclosure;
  (d) servers housed in a common rack;
  (e) racks or blades housed in a common cluster (=group of racks, e.g. 30);
  (f) clusters housed in a common room;
  (g) clusters in a common building;
  (h) buildings in a common site; and/or
  (i) sites in a common jurisdiction.

In summary, each access control record can define a policy for a given data type in the context of a particular storage device group. The policy stipulates which data types are allowed to coexist within that group. Here, it is noted that different groups can be at the same storage level and be of the same type of storage device(s).

For example, with reference to FIG. 1, datastore 132-1 may be one group and datastore 132-2 a second group, and datastore 132-3 a third group, and thus include different policies that govern the coexistence of different data types on each of them. The same may be true for virtual disk groups.

In various embodiments, as data is mapped downwards from the top tier of the data storage through one or more intermediate virtualization tier(s) to the physical storage tier, appropriate separation of data types may be maintained. So, for example, if separate virtual disks are created at a top tier for each of backup data, operating system data and/or other data, then the policies should be specified to at least preserve separation between backup data and the data it is backing up at the physical data storage tier.

The data types in the data type record can each be identified by an identifying tag, which for example may be a text label. The identifying tag may conveniently be stored together with the logical unit number (LUN) of the logical unit of data.

Referring again to FIG. 1, the runtime manager 144 is responsible for management of the data operations. The management associates one of the data types with each logical unit of data and controls movements of logical units of data within the system that take place as a result of data operations so as to maintain compliance with the policies defined in the access control records. Example data operations can include, but are not limited to: a write operation, a delete operation, a copy operation, and a move operation, among other operations that may be possible and contemplated herein.

In various embodiments, the system can ensure that every logical unit of data is stored with an identifying tag to indicate its data type. However, it is also a useful precaution that the runtime manager is able to process logical units that do not include a recognized identifying tag, which might arise if a logical unit has an identifying tag, but the tag is not one stored in the data type record, or if there is no identifying tag. Consequently, it can be useful if the runtime manager is operable to process a logical unit of data to detect absence of one of the recorded identifying tags.

If there is no tag, or the tag is not recognized, the runtime manager is operable to apply a default policy to movements of such untagged logical units of data within the system. The default policy may be permissive and permit untagged logical units of data to share data storage devices with other logical units of data in an unrestricted manner. Alternatively, the default policy may be restrictive and does not permit untagged logical units of data to share data storage devices with at least some of the data types specified by the identifying tags. The default policy may also depend on data operation (e.g. be different for each of the data operation types such as write, move, copy, delete, etc.).

In various embodiments, the runtime manager is operable to generate an alert when a data operation cannot be performed without violating one of the policies. For example, the alert can be sent to a system administrator who could then provision additional storage to enable the data operation to be performed. Alternatively, or additionally, the alert can be handled automatically if a system element has been programmed to deal with such a situation (e.g. by applying logic to decide whether the data operation can nevertheless be performed in violation of the policy, or by having the ability to automatically provision additional storage, or the ability to perform a data clean up process, which may (or may not) release sufficient data storage space to enable the data operation to be performed without violating the policies).

The data storage devices may be grouped for the purpose of access control in various different ways. For example, a group may relate only to physical data storage devices or only to virtual data storage devices. Several groups are likely to consist of physical or virtual data storage devices that are situated in the same tier of the data storage hierarchy. Moreover, it is likely in many implementations that there are groups at different tiers (e.g. one or more groups consisting of data storage devices in one tier and one or more groups consisting of data storage devices in another tier).

As described herein, the initial creation and subsequent movement of data, whether that be by manual movement (e.g., manual VM migration) or automatic movement (e.g., tiering) may be carried out in a way that ensures that data of inappropriate datatypes does not end up being stored on the same back-end disks. In some embodiments, this can be implemented by tagging the units of logical data (e.g. with LUNs, file systems or virtual disks) and applying policies in relation to the different tag types when performing data movements. One advantage of this process is that when LUNs, file systems, and/or virtual disks are moved by applying the policies automatically leads to an appropriate selection of a target (or an alert indicating there is nowhere to store the data without violating the policies), without a system administrator thinking about what design constraints should be applied when moving data (e.g. based on a written specification).

The placing of data, in various embodiments, may be a different RAID Stripe, separate disks within a distributed RAID system, a different disk pool or a different tier. The net effect of applying the proposed approach is to avoid taking unintended risks when storing data, which may lead to data loss (e.g. to avoid storing database data and its backup data together).

Figure 3:
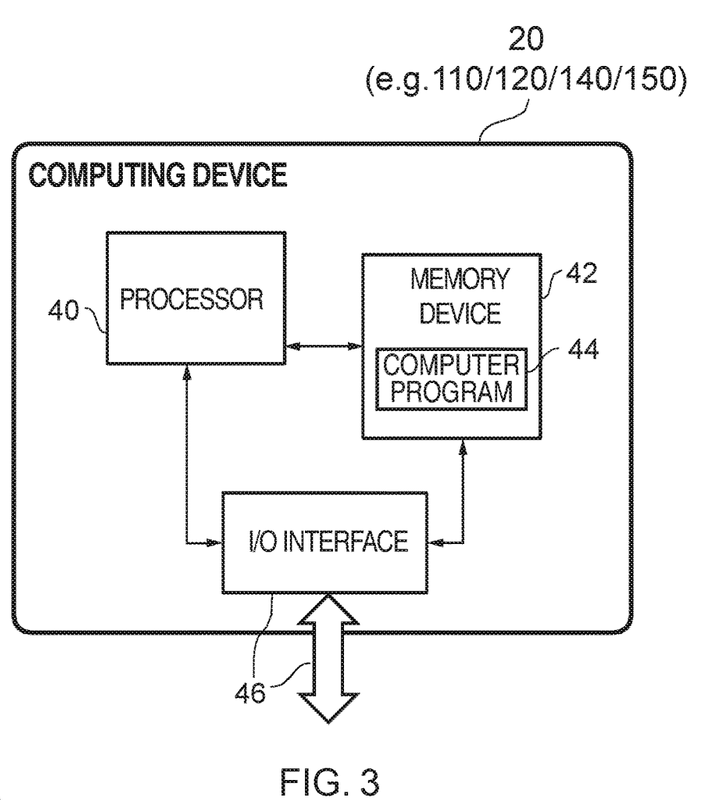
FIG. 3 is a diagram illustrating internal structure of a generic computing device which may represent the internal design of computing elements shown in FIG. 1.

Referring to FIG. 3, FIG. 3 shows a generic computing device 20, which may be one of the physical servers 110, one of the virtual machines 120, the data controller 140, or one of the user devices 150 described elsewhere herein. The computing device 20, at least in the illustrated embodiments, includes a processor 40 to provide a processor resource coupled through an I/O interface 46 to one or more external devices.

The processor 40 may also be connected to one or more memory devices 42. At least one memory device 42 provides a memory resource to store a computer program 44, which includes a computer program with computer-executable instructions. The data storage devices 48 may store the computer program 44. The computer program 44 stored in the storage devices 48 is configured to be executed by processor 40 via the memory devices 42. The processor 40 executes the stored computer program 44.

Figure 4:
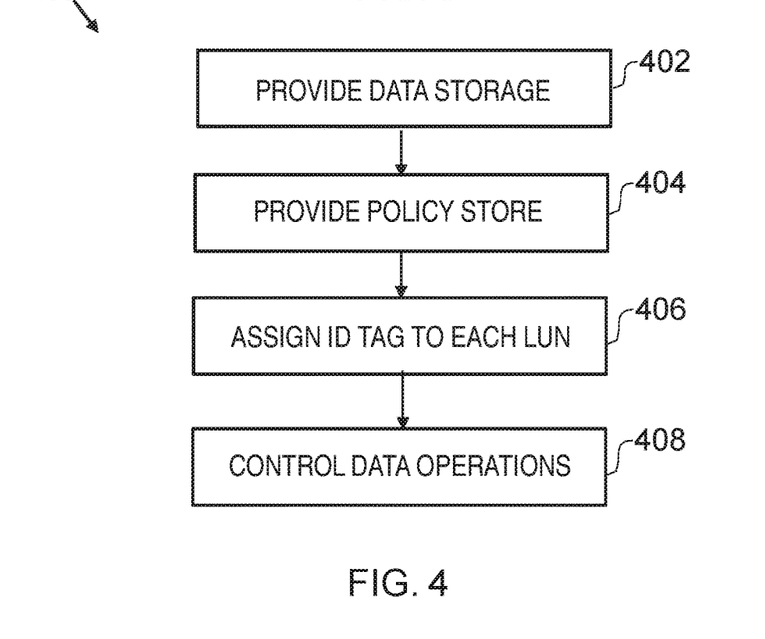
FIG. 4 is a flow diagram showing one embodiment of a method according to one embodiment.

FIG. 4 is a process flow diagram showing a method 400 for managing data in shared storage systems, such as virtualized storage arrays, physical disks and hypervisor data stores according to one embodiment. The process flow may be computer automated (e.g. by execution of a computer program loaded into the data controller 140). The method 400 serves to manage how data operations are performed in the multi-tiered data storage system of FIG. 1.

The method 400 can begin by providing a plurality of data storage devices including a bottom tier of data storage devices made up of a plurality of physical data storage devices and at least one higher tier of data storage devices (block 402). In some embodiments, each higher tier includes a plurality of virtual data storage devices.

The method 400 further provides a policy store in which a data type record storing a list of data types recognized by the system and a plurality of access control records is stored (block 404). In some embodiments, each access control record specifies a policy for a given data type, stipulating with which of the other data types it is permitted or not permitted to share at least one specified group of the data storage devices.

A data type is associated with each logical unit of data (block 406). Further, movement of logical units of data within the system that take place as a result of data operations is controlled (block 408). In some embodiments, the control relates to how the logical units are mapped between the data storage tiers within the system, and how this mapping changes dynamically as data operations are performed. The operations can be performed so that changes in the location of logical units of data (at any specified tier of the data storage system) comply with all the policies that are set out in the access control records.

It is clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof. Further, it is equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the various embodiments disclosed herein may be realized in the form of a computer-implemented method of deploying a service comprising steps of deploying a computer program operable to, when deployed into a computer infrastructure and executed thereon, cause the computing device to perform all the operations of the method. It can be appreciated that the method and components of the various embodiments may alternatively or additionally be embodied fully or partially in a parallel computing system comprising two or more processors for executing parallel software.

In some embodiments, a computer program product may be defined in terms of a system and method. The computer program product may include a computer-readable storage medium (or media) including computer-readable program instructions thereon for causing a processor to carry out aspects of the various embodiments. The computer-readable storage medium can be a tangible device that can retain and store instructions for use by an instruction execution device.

The various embodiments may include a system, a method, and/or a computer program product. The computer program product may include a computer-readable storage medium (or media) including computer-readable program instructions thereon for causing a processor to carry out aspects of the various embodiments.

The computer-readable storage medium can be a tangible device that can retain and store instructions for use by an instruction execution device. The computer-readable storage medium may include, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can include, but is not limited to: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer-readable program instructions described herein can be downloaded to respective computing/processing devices from a computer-readable storage medium or to an external computer or external storage device via a network (e.g., the Internet, a local area network, a wide area network and/or a wireless network). The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the various embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, or the connection may be made to an external computer (e.g., through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the various embodiments are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein includes an article of manufacture including instructions that implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions that execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computer system. Rather, the various embodiments are capable of being implemented in conjunction with any other type of computer system now known or developed in the future.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may include the following:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the computing resources of a provider are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models can include the following:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models may include the following:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computer system is service oriented with a focus on statelessness, low coupling, modularity, and semantic interoperability. At the heart of cloud computing is an infrastructure that includes a network of interconnected nodes.

Figure 5:
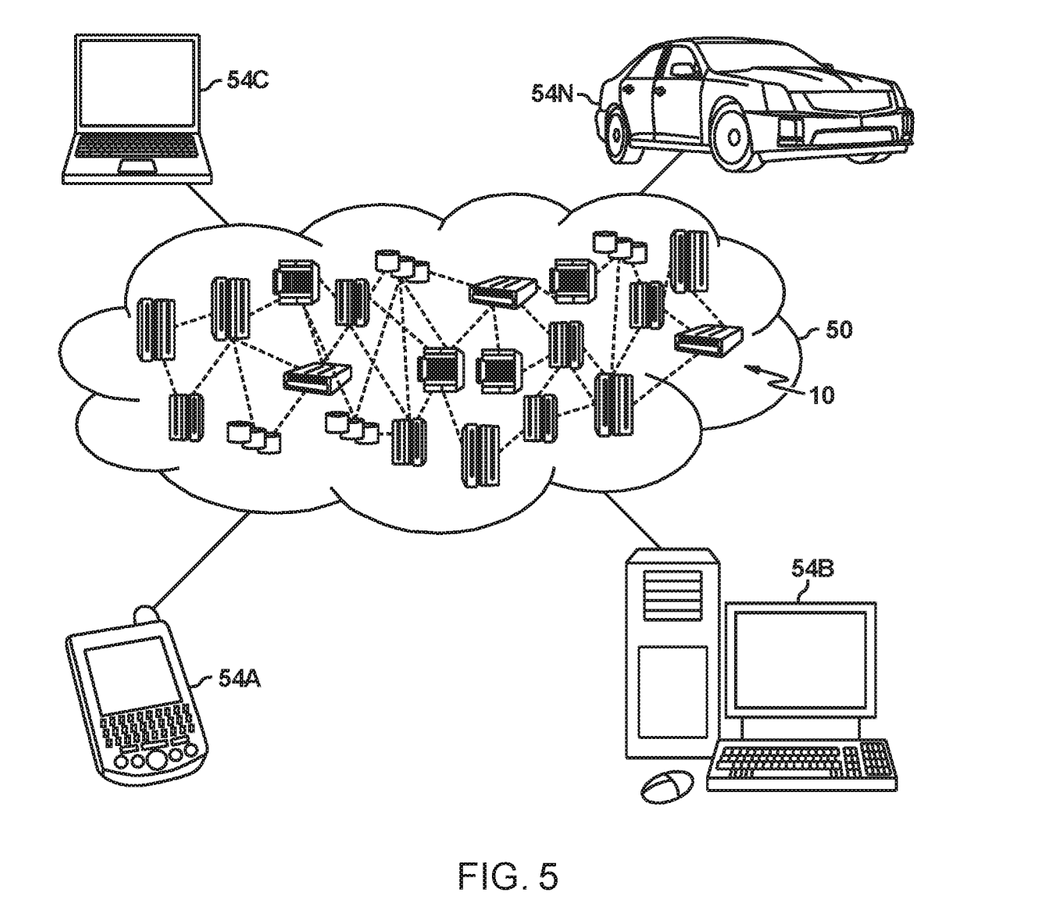
FIG. 5 is a diagram illustrating one embodiment of a cloud computer system.

Referring now to FIG. 5, FIG. 5 illustrates a cloud computer system 50. At least in the illustrated embodiment, cloud computer system 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another.

The cloud computing nodes 10 may be grouped physically or virtually, in one or more networks, such as Private, Community, Public, or Hybrid clouds, or a combination thereof, as discussed elsewhere herein. Grouping allows cloud computer system 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computer system 50 can communicate with any type of computerized device over any type of network and/or network addressable connection (e.g., using a web browser).

Figure 6:
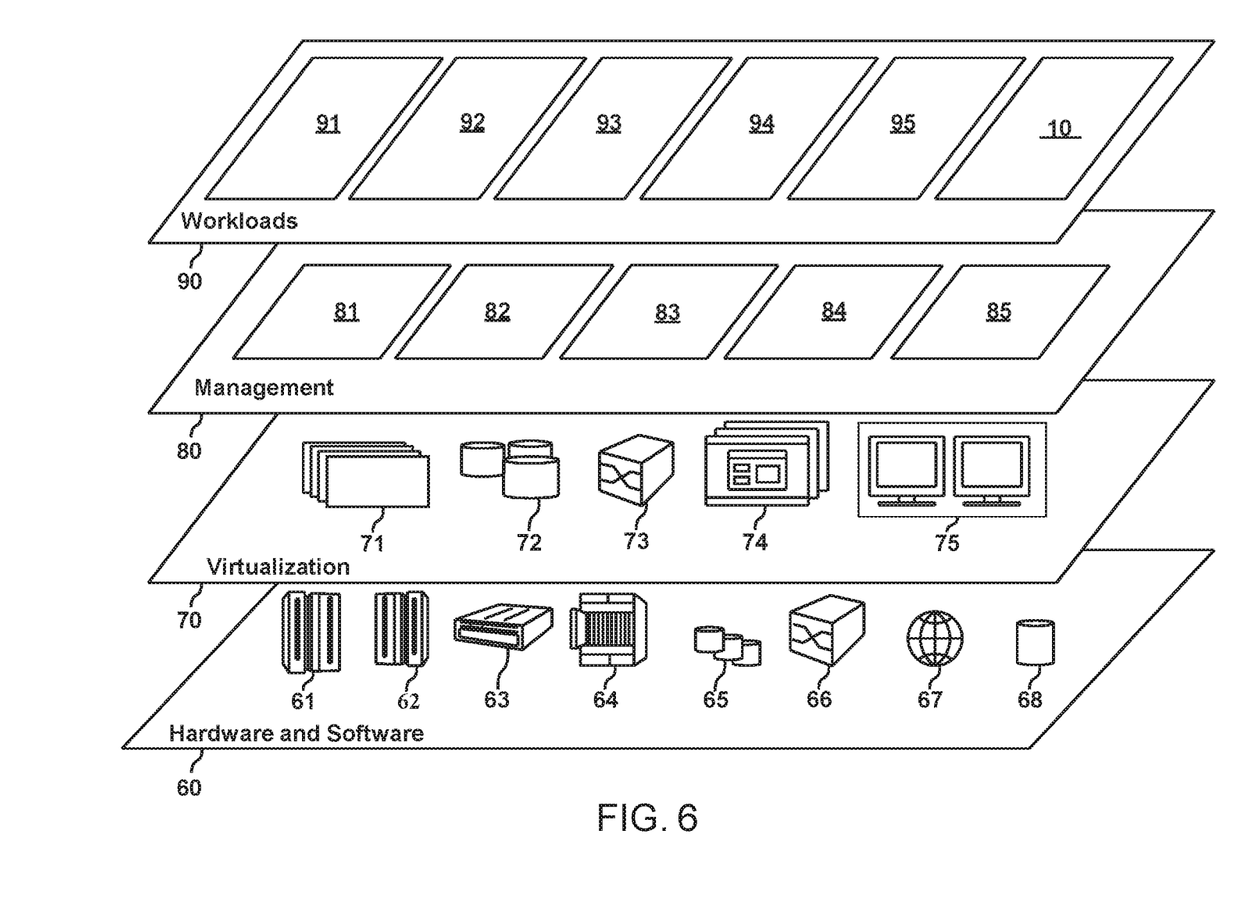
FIG. 6 is a diagram illustrating one embodiment of abstraction model layers.

Referring now to FIG. 6, a set of functional abstraction layers provided by the cloud computer system 50 of FIG. 5 is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include, but are not limited to: mainframes 61, Reduced Instruction Set Computer (RISC) architecture based servers 62, servers 63, blade servers 64, storage devices 65, and networks and networking components 66. In some embodiments, software components include network application server software 67 and database software 68.

Virtualization layer 70 provides an abstraction layer from which the following examples of virtual entities may be provided, but are not limited to: virtual servers 71, virtual storage 72, virtual networks 73, including virtual private networks, virtual applications and operating systems 74, and virtual clients 75.

In one example, management layer 80 may provide the functions described below. Resource provisioning 81 provides dynamic procurement of computing resources and other resources that are utilized to perform tasks within the cloud computer system. Metering and Pricing 82 provide cost tracking as resources are utilized within the cloud computer system, and billing or invoicing for consumption of these resources.

In another example, these resources may include application software licenses. Security provides identity verification for cloud consumers and tasks, as well as protection for data and other resources. User portal 83 provides access to the cloud computer system for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computer system may be utilized. Examples of workloads and functions which may be provided from this layer include, but are not limited to: mapping and navigation 91, software lifecycle management 92, virtual classroom education delivery 93, data analytics processing 94, transaction processing 95, and software development cycle management 96 according to embodiments of the disclosure.

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. A multi-tiered data storage system comprising:
a first tier of data storage devices including a plurality of storage device groups, wherein each of the plurality of storage device groups includes one or more physical data storage devices;
a second tier of data storage devices including a plurality of virtual data storage devices mapped to the plurality of storage device groups, wherein the plurality of virtual data storage devices includes a plurality of logical units of data;
and a data controller configured to manage data operations for the plurality of logical units of data on the plurality of virtual data storage devices, the data controller comprising:
a policy store including one or more access control records, wherein:
each access control record is associated with a respective storage device group in the plurality of storage device groups,
each access control record defines a policy for storing one or more types of data on the respective storage device group,
and one of the one or more access control records defines the policy specifying that backup data cannot be shared with other data types,
a policy module that implements the policy defined in each access control record, and a runtime module that:
manages movements of the plurality of logical units of data in accordance with the policy of the one of the one or more access control records,
and maps the plurality of virtual storage devices to the plurality of storage device groups in accordance with the policy of the one of the one or more access control records.

2. The system of claim 1, wherein:
the policy store stores:
a storage device group record storing a list of the plurality of storage device groups recognized by the multi-tiered data storage system.

3. The system of claim 1, wherein each of the plurality of logical units of data stores an identifying tag.

4. The system of claim 3, wherein:
a logical unit of data in the plurality of logical units of data does not store an identifying tag;
and the runtime module is configured to:
process the logical unit of data to detect an absence of the identifying tag,
and in response to detecting the absence of the identifying tag, applies a default policy to data operations on the logical unit of data.

5. The system of claim 3, wherein the identifying tag is a text label.

6. The system of claim 4, wherein the default policy is permissive and permits storing the logical unit of data with others of the plurality of logical units of data in an unrestricted manner.

7. The system of claim 4, wherein the default policy is restrictive and does not permit storing the logical unit of data with others of the plurality of logical units of data.

8. The system of claim 1, wherein the runtime module is configured to generate an alert when a data operation violates any one of the policy in each of the one or more access control records.

9. The system of claim 1, wherein the one or more physical data storage devices comprises one or more of:
   (a) a plurality of partitions in a common physical disk;
   (b) a plurality of physical disks in a common server;
   (c) a plurality of servers mounted on a plurality of blades housed in a common blade enclosure;
   (d) a plurality of servers housed in a common rack;
   (e) a plurality of racks or a plurality of blades housed in a common cluster;
   (f) a plurality of clusters housed in a common room;
   (g) a plurality of clusters in a common building;
   (h) a plurality of buildings in a common site;
   and (i) a plurality of sites in a common jurisdiction.

10. A method, comprising:
   providing a first tier of data storage devices including a plurality of storage device groups, wherein each of the plurality of storage device groups includes one or more physical data storage devices;
   providing a second tier of data storage devices including a plurality of virtual data storage devices mapped to the plurality of storage device groups, wherein the plurality of virtual data storage devices includes a plurality of logical units of data;
   providing a policy store including one or more access control records, wherein:
      each access control record is associated with a respective storage device group in the plurality of storage device groups,
      each access control record defines a policy for storing one or more types of data on the respective storage device group,
      and one of the one or more access control records defines the policy specifying that backup data cannot be shared with other data types;
   implementing, by a processor, the policy defined in each access control record;
   managing, by the processor, movement of the plurality of logical units of data in accordance with the policy of the one of the one or more access control records;
   and mapping, by the processor, the plurality of virtual data storage devices to the plurality of storage device groups in accordance with the policy of the one of the one or more access control records.

11. The method of claim 10, further comprising:
   storing a storage device group record storing a list of the plurality of storage device groups recognized by the multi-tiered data storage system.

12. The method of claim 10, wherein:
   a logical unit of data in the plurality of logical units does not store an identifying tag;
   and the method further comprises:
      detecting an absence of the identifying tag in the logical unit of data,
      and in response to detecting the absence of the identifying tag, applying a default policy to data operations on the logical unit of data,
      wherein the default policy is permissive and permits storing the logical unit of data with others of the plurality of logical units of data in an unrestricted manner.

13. The method of claim 10, wherein:
   a logical unit of data in the plurality of logical units does not store an identifying tag;
   and the method further comprises:
      detecting an absence of the identifying tag in the logical unit of data,
      and in response to detecting the absence of the identifying tag, applying a default policy to data operations on the logical unit of data,
      wherein the default policy is restrictive and does not permit storing the logical unit of data with others of the plurality of logical units of data.

14. The method of claim 10, wherein each of the plurality of logical units of data stores an identifying tag.

15. A computer program product comprising a computer readable storage medium having program instructions embodied therewith, the program instructions executable by a processor to cause the processor to:
   provide a first tier of data storage devices including a plurality of storage device groups, wherein each of the plurality of storage device groups includes one or more physical data storage devices;
   provide a second tier of data storage devices including a plurality of virtual data storage devices mapped to the plurality of storage device groups, wherein the plurality of virtual data storage devices includes a plurality of logical units of data;
   provide a policy store including one or more access control records, wherein:
      each access control record is associated with a respective storage device group in the plurality of storage device groups,
      each access control record defines a policy for storing one or more types of data on the respective storage device group,
      and one of the one or more access control records defines the policy specifying that backup data cannot be shared with other data types;
   implement the policy defined in each access control record;
   manage movement of the plurality of logical units of data in accordance with the policy of the one of the one or more access control records;
   and map the plurality of virtual data storage devices to the plurality of storage device groups in accordance with the policy of the one of the one or more access control records.

16. The computer program product of claim 15, wherein the program instructions further cause the processor to:
   store a storage device group record storing a list of the plurality of storage device groups recognized by the multi-tiered data storage system.

17. The computer program product of claim 15, wherein:
   a logical unit of data in the plurality of logical units does not store an identifying tag;
   and the program instructions further cause the processor to:
      detect an absence of the identifying tag in the logical unit of data,
      and apply a default policy to data operations on the logical unit of data in response to detecting the absence of the identifying tag, wherein the default policy is permissive and permits storing the logical unit of data with others of the plurality of logical units of data in an unrestricted manner.

18. The computer program product of claim 15, wherein:
a logical unit of data in the plurality of logical units does not store an identifying tag;
and the program instructions further cause the processor to:
detect an absence of the identifying tag in the logical unit of data,
and in response to detecting the absence of the identifying tag, apply a default policy to data operations on the logical unit of data,
wherein the default policy is restrictive and does not permit storing the logical unit of data with others of the plurality of logical units of data.

19. The computer program product claim of claim 15, wherein each of the plurality of logical units of data stores an identifying tag.

20. The computer program product claim of claim 19, wherein the identifying tag is a text label.

* * * * *